United States Patent
Cruz Serna

(10) Patent No.: US 10,918,115 B2
(45) Date of Patent: Feb. 16, 2021

(54) TRANS FREE AND LOW SATURATED FAT COCOA BUTTER ALTERNATIVE

(71) Applicant: Team Foods Colombia S.A., Bogota (CO)

(72) Inventor: Adriana Fernanda Cruz Serna, Bogota (CO)

(73) Assignee: Team Foods Colombia S.A., Bogota (CO)

( * ) Notice: Subject to any disclaimer, the term of this patent is extended or adjusted under 35 U.S.C. 154(b) by 694 days.

(21) Appl. No.: 15/317,363

(22) PCT Filed: Jun. 19, 2014

(86) PCT No.: PCT/IB2014/001135
§ 371 (c)(1),
(2) Date: Dec. 8, 2016

(87) PCT Pub. No.: WO2015/193693
PCT Pub. Date: Dec. 23, 2015

(65) Prior Publication Data
US 2017/0119008 A1    May 4, 2017

(51) Int. Cl.
*A23G 1/38* (2006.01)
*C11C 3/10* (2006.01)
*A23D 9/00* (2006.01)

(52) U.S. Cl.
CPC .............. *A23G 1/38* (2013.01); *A23D 9/00* (2013.01); *C11C 3/10* (2013.01)

(58) Field of Classification Search
None
See application file for complete search history.

(56) References Cited

U.S. PATENT DOCUMENTS

| 5,258,197 A | 11/1993 | Wheeler et al. |
| 2011/0177227 A1 | 7/2011 | Cruz Serma et al. |

FOREIGN PATENT DOCUMENTS

| EP | 2443935 A1 | 4/2012 |
| EP | 2692238 A1 | 2/2014 |
| WO | 2008/035968 A2 | 3/2008 |
| WO | 2013/132284 A1 | 9/2013 |
| WO | WO-2013132284 A1 * | 9/2013 |

OTHER PUBLICATIONS

International Search Report from International Application No. PCT/IB2014/001135 dated Jan. 14, 2015.
Lipp et al., "Review of cocoa butter and alternative fats for use in chocolate—Part A. Compositional data", Food Chemistry, vol. 62, No. 1, pp. 73-97, 1998.

* cited by examiner

*Primary Examiner* — Erik Kashnikow
*Assistant Examiner* — Assaf Zilbering
(74) *Attorney, Agent, or Firm* — Greenberg Traurig, LLP

(57) ABSTRACT

A cocoa butter alternative and the method of making thereof that includes 62-84% saturated fatty acid content having 20-40%) lauric acid content, 8-20% myristic acid content, 9-37% palmitic acid content, and 3-17% stearic acid content. The fat may include 16-38%) unsaturated fatty acid content including 15-30% oleic acid content, 10% linoleic acid content; and 4% linolenic acid content and 28-95%) of interesterified fat mixture of lauric and non-lauric vegetable oils. The fat mixture may include 40-60% of palm kernel oil, coconut oil, or fractions thereof and 40-60% of palm oil or fractions. The fat may include 2-40% of vegetable oil such as sunflower, safflower, low erucic rapeseed, canola, soy bean, high oleic sunflower, high oleic safflower, high oleic rapeseed, high oleic canola, high oleic soy bean, palm fractions, hybrid palm, or olive oils and 5-40% of lauric hard fat such as palm kernel or coconut oil or fractions thereof.

4 Claims, No Drawings

TRANS FREE AND LOW SATURATED FAT COCOA BUTTER ALTERNATIVE

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The instant invention relates to cocoa butter alternatives.

BACKGROUND OF THE INVENTION

In recent years, there is an increased demand for new cocoa butter alternatives than can provide healthier profiles in terms of trans free fat, partially hydrogenated free fat and less saturated fat according the last governments regulations in the world but still have a good structure, speed of crystallization, heat resistance and good melting properties for chocolate/confectionary products.

SUMMARY OF THE INVENTION

In an embodiment, the present invention is a fat comprising 62% to 84% saturated fatty acid content. In some embodiments, the saturated fatty acid content of the fat comprises 20% and 40% lauric acid content, 8% and 20% myristic acid content, 9% and 37% palmitic acid content, and 3% and 17% stearic acid content.

In some embodiments, the fat comprises 16% to 38% unsaturated fatty acid content, based on a total amount of fatty acids in the fat. In some embodiments, the unsaturated fatty acid content of the fat comprises: 15% to 30% oleic acid content, 10% or less linoleic acid content; and 4% or less linolenic acid content.

In some embodiments, the fat comprises 28% to 95% of an interesterified fat mixture of lauric and non-lauric vegetable oils, based on a total weight of the fat. In some embodiments, the fat mixture comprises: 40% to 60% of at least one of a palm kernel oil, one or more fractions of the palm kernel oil, coconut oil, or one or more fractions of the coconut oil, based on a total weight of the fat mixture. In some embodiments, the palm kernel oil, the one or more fractions of the palm kernel oil, the coconut oil, and the one or more fractions of the coconut oil have an iodine value of 9 or less.

In some embodiments, the fat mixture comprises 40% to 60% of at least one of a palm oil or one or more fractions of the palm oil, based on the total weight of the fat mixture. In some embodiments, the palm oil and the one or more fractions of the palm oil have an iodine value from 1 to 38.

In some embodiments, the fat comprises 2% and 40% of vegetable oil, based on a total weight of the fat. In some embodiments, the vegetable oil comprises at least one of sunflower oil, safflower oil, low erucic rapeseed oil, canola oil, soy bean oil, high oleic sunflower oil, high oleic safflower oil, high oleic rapeseed oil, high oleic canola oil, high oleic soy bean oil, palm fractions, hybrid palm oil, olive oil or cotton oil.

In some embodiments, the fat comprises 5% to 40% of a lauric hard fat, based on the total weight of the fat. In some embodiments, the lauric hard fat has an iodine value of 9 or less. In some embodiments, the lauric hard fat comprises at least one of palm kernel oil, one or more fractions of palm kernel oil, coconut oil, or one or more fractions of coconut oil.

In some embodiments, the fat is configured to be a cocoa butter alternative.

In some embodiments, a solid fat content of the fat is at least one of: 58% to 90% at 10 degrees Celsius, 44% to 74% at 20 degrees Celsius, 15% to 40% at 30 degrees Celsius, 12% or less at 35 degrees Celsius, and 4% or less at 40 degrees Celsius. In some embodiments, the fat has a slip melting point of the fat is 36 to 40 degrees Celsius. In some embodiments, the trans fatty acids are less than 1%.

In some embodiments, the fat further comprises 3% or less of an emulsifier or an additive. In some embodiments, the emulsifier or additive is at least one of a monoglyceride, diglyceride or triglyceride mixture of saturated fatty acids having at least 16 carbon atoms each, sorbitan esters (STS/SMS), polyglycerol, or polyglycerol esters.

In some embodiments, the present invention is a method comprising combining a lauric fat having an iodine value less than 10 with a non-lauric fat having an iodine value from 1 to 38 to form a fat mixture, wherein the fat mixture comprises 40% to 60% lauric fat and 40% to 60% non-lauric fat based on a total weight of the fat mixture. In some embodiments, the method comprises interesterifying the fat mixture. In some embodiments, the method comprises producing a lauric hard fat of at least one of palm kernel or coconut oil having an iodine value of 9 or less from a fractionation process. In some embodiments, the method comprises blending the interesterified fat mixture, the lauric hard fat and a vegetable oil to form a blended fat.

In some embodiments, the blended fat comprises 28 to 92% of the interesterified mixture, from 2% to 40% of the vegetable oil and from 5 to 40% of the hard lauric fat, based on the total weight of the blended fat. In some embodiments, the blended fat comprises one or more of the fats detailed herein.

In some embodiments, the method comprises adding 3% or less of an emulsifier or additive. In some embodiments, the emulsifier or additive is at least one of a monoglyceride, diglyceride or triglyceride mixture of saturated fatty acids having at least 16 carbon atoms each, sorbitan esters (STS/SMS), polyglycerol, or polyglycerol esters.

DETAILED DESCRIPTION

Specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Physical properties defined hereinafter are measured at 20 to 25 degrees Celsius (° C.) unless otherwise specified.

As used herein, the term saturated fatty acids means a fatty acid without double bonds, the term unsaturated fatty acid means a fatty acid with at least one (monounsaturated) or more (polyunsaturated) double bonds, and the term trans-fat means a trans-isomer (E-isomer) of a fatty acid.

As used herein, the term lauric fat means a fat having more than 35% lauric fatty acids, based on a total amount of fatty acids in the lauric fat, and the term non-lauric fat means a fat having less than 4% lauric fatty acids based on a total amount of fatty acids in the lauric fat. Examples of lauric fats include, but are not limited to, palm kernel oil and coconut oil. Examples of non-lauric fats include, but are not limited to, palm oil and cottonseed oil.

In one embodiment, the present invention provides a trans-fat free cocoa butter alternative with a lower saturated fatty acid content usable in chocolate and cocoa confectionary products and a method to make the same.

In one embodiment, the cocoa butter alternative includes both unsaturated and saturated fatty acids and a content of trans-fat fatty acids low enough to be considered as a trans-fat free product under the U.S. Food and Drug Administration's ("FDA") Definitions of Nutrient Content Claims. In one example, the cocoa butter alternative has 0.5 grams or less trans-fats per 100 grams of cocoa butter alternative. In yet another example, a trans-fatty acid content of the cocoa butter alternative is 1% or less based on a total amount of fatty acids in the cocoa butter alternative. The fatty acid content in the cocoa butter alternative can be determined, for example, using American Oil Chemists' Society (AOCS) method Ce1-e91.

In an embodiment, the present invention is a fat comprising 62% to 84% saturated fatty acid content, based on a total amount of fatty acids in the fat. In some embodiments, the fat comprises 62% to 80% saturated fatty acid content. In some embodiments, the fat comprises 62% to 75% saturated fatty acid content. In some embodiments, the fat comprises 62% to 70% saturated fatty acid content. In some embodiments, the fat comprises 65% to 84% saturated fatty acid content. In some embodiments, the fat comprises 70% to 84% saturated fatty acid content. In some embodiments, the fat comprises 75% to 84% saturated fatty acid content. In some embodiments, the fat comprises 80% to 84% saturated fatty acid content.

In some embodiments, the saturated fatty acid content of the fat comprises 20% and 40% lauric acid content, 8% and 20% myristic acid content, 9% and 37% palmitic acid content, and 3% and 17% stearic acid content. In some embodiments, the saturated fatty acid content of the fat comprises 20% and 35% lauric acid content. In some embodiments, the saturated fatty acid content of the fat comprises 20% and 30% lauric acid content. In some embodiments, the saturated fatty acid content of the fat comprises 20% and 25% lauric acid content. In some embodiments, the saturated fatty acid content of the fat comprises 25% and 40% lauric acid content. In some embodiments, the saturated fatty acid content of the fat comprises 30% and 40% lauric acid content. In some embodiments, the saturated fatty acid content of the fat comprises 35% and 40% lauric acid content.

In some embodiments, the saturated fatty acid content of the fat comprises 10% and 20% myristic acid content. In some embodiments, the saturated fatty acid content of the fat comprises 10% and 15% myristic acid content. In some embodiments, the saturated fatty acid content of the fat comprises 8% and 15% myristic acid content.

In some embodiments, the saturated fatty acid content of the fat comprises 15% and 37% palmitic acid content. In some embodiments, the saturated fatty acid content of the fat comprises 20% and 37% palmitic acid content. In some embodiments, the saturated fatty acid content of the fat comprises 25% and 37% palmitic acid content. In some embodiments, the saturated fatty acid content of the fat comprises 30% and 37% palmitic acid content. In some embodiments, the saturated fatty acid content of the fat comprises 9% and 30% palmitic acid content. In some embodiments, the saturated fatty acid content of the fat comprises 9% and 25% palmitic acid content. In some embodiments, the saturated fatty acid content of the fat comprises 9% and 20% palmitic acid content. In some embodiments, the saturated fatty acid content of the fat comprises 9% and 15% palmitic acid content.

In some embodiments, the saturated fatty acid content of the fat comprises 3% and 15% stearic acid content. In some embodiments, the saturated fatty acid content of the fat comprises 3% and 12% stearic acid content. In some embodiments, the saturated fatty acid content of the fat comprises 3% and 8% stearic acid content. In some embodiments, the saturated fatty acid content of the fat comprises 5% and 17% stearic acid content. In some embodiments, the saturated fatty acid content of the fat comprises 8% and 17% stearic acid content. In some embodiments, the saturated fatty acid content of the fat comprises 12% and 17% stearic acid content In some embodiments, the fat comprises 16% to 38% unsaturated fatty acid content, based on a total amount of fatty acids in the fat. In some embodiments, the fat comprises 20% to 38% unsaturated fatty acid content. In some embodiments, the fat comprises 25% to 38% unsaturated fatty acid content. In some embodiments, the fat comprises 30% to 38% unsaturated fatty acid content. In some embodiments, the fat comprises 16% to 35% unsaturated fatty acid content. In some embodiments, the fat comprises 16% to 30% unsaturated fatty acid content. In some embodiments, the fat comprises 16% to 25% unsaturated fatty acid content. In some embodiments, the fat comprises 16% to 20% unsaturated fatty acid content.

In some embodiments, the unsaturated fatty acid content of the fat comprises: 15% to 30% oleic acid content, 10% or less linoleic acid content; and 4% or less linolenic acid content. In some embodiments, the unsaturated fatty acid content of the fat comprises: 15% to 25% oleic acid content. In some embodiments, the unsaturated fatty acid content of the fat comprises: 15% to 20% oleic acid content. In some embodiments, the unsaturated fatty acid content of the fat comprises: 20% to 30% oleic acid content. In some embodiments, the unsaturated fatty acid content of the fat comprises: 25% to 30% oleic acid content.

In some embodiments, the unsaturated fatty acid content of the fat comprises: 1% to 10% linoleic acid content. In some embodiments, the unsaturated fatty acid content of the fat comprises: 3% to 10% linoleic acid content. In some embodiments, the unsaturated fatty acid content of the fat comprises: 5% to 10% linoleic acid content. In some embodiments, the unsaturated fatty acid content of the fat comprises: 7% to 10% linoleic acid content. In some embodiments, the unsaturated fatty acid content of the fat comprises: 1% to 8% linoleic acid content. In some embodiments, the unsaturated fatty acid content of the fat comprises: 1% to 5% linoleic acid content. In some embodiments, the unsaturated fatty acid content of the fat comprises: 1% to 3% linoleic acid content. In some embodiments, the unsaturated fatty acid content of the fat comprises: 8% or less linoleic acid content. In some embodiments, the unsaturated fatty acid content of the fat comprises: 5% or less linoleic acid content. In some embodiments, the unsaturated fatty acid content of the fat comprises: 3% or less linoleic acid content. In some embodiments, the unsaturated fatty acid content of the fat comprises: 0% or less linoleic acid content.

In some embodiments, the unsaturated fatty acid content of the fat comprises 4% or less linolenic acid content. In some embodiments, the unsaturated fatty acid content of the fat comprises 3% or less linolenic acid content. In some embodiments, the unsaturated fatty acid content of the fat comprises 2% or less linolenic acid content. In some embodiments, the unsaturated fatty acid content of the fat comprises 1% to 4% linolenic acid content. In some embodiments, the unsaturated fatty acid content of the fat comprises 2% to 4% linolenic acid content. In some embodiments, the unsaturated fatty acid content of the fat comprises 1% to 3% linolenic acid content. In some embodiments, the unsaturated fatty acid content of the fat comprises 0% linolenic acid content.

In some embodiments, the fat comprises 28% to 90% of an interesterified fat mixture of lauric and non-lauric vegetable oils, based on a total weight of the fat. In some embodiments, the fat comprises 28% to 80% of an interesterified fat mixture of lauric and non-lauric vegetable oils, based on a total weight of the fat. In some embodiments, the fat comprises 28% to 70% of an interesterified fat mixture of lauric and non-lauric vegetable oils, based on a total weight of the fat. In some embodiments, the fat comprises 28% to 60% of an interesterified fat mixture of lauric and non-lauric vegetable oils, based on a total weight of the fat. In some embodiments, the fat comprises 28% to 50% of an interesterified fat mixture of lauric and non-lauric vegetable oils, based on a total weight of the fat. In some embodiments, the fat comprises 28% to 40% of an interesterified fat mixture of lauric and non-lauric vegetable oils, based on a total weight of the fat. In some embodiments, the fat comprises 28% to 35% of an interesterified fat mixture of lauric and non-lauric vegetable oils, based on a total weight of the fat. In some embodiments, the fat comprises 35% to 95% of an interesterified fat mixture of lauric and non-lauric vegetable oils, based on a total weight of the fat. In some embodiments, the fat comprises 45% to 95% of an interesterified fat mixture of lauric and non-lauric vegetable oils, based on a total weight of the fat. In some embodiments, the fat comprises 55% to 95% of an interesterified fat mixture of lauric and non-lauric vegetable oils, based on a total weight of the fat. In some embodiments, the fat comprises 65% to 95% of an interesterified fat mixture of lauric and non-lauric vegetable oils, based on a total weight of the fat. In some embodiments, the fat comprises 75% to 95% of an interesterified fat mixture of lauric and non-lauric vegetable oils, based on a total weight of the fat. In some embodiments, the fat comprises 85% to 95% of an interesterified fat mixture of lauric and non-lauric vegetable oils, based on a total weight of the fat.

In some embodiments, the fat mixture comprises: 40% to 60% of at least one of a palm kernel oil, one or more fractions of the palm kernel oil, coconut oil, or one or more fractions of the coconut oil, based on a total weight of the fat mixture. In some embodiments, the fat mixture comprises: 45% to 60% of at least one of a palm kernel oil, one or more fractions of the palm kernel oil, coconut oil, or one or more fractions of the coconut oil, based on a total weight of the fat mixture. In some embodiments, the fat mixture comprises: 50% to 60% of at least one, of a palm kernel oil, one or more fractions of the palm kernel oil, coconut oil, or one or more fractions of the coconut oil, based on a total weight of the fat mixture. In some embodiments, the fat mixture comprises: 55% to 60% of at least one of a palm kernel oil, one or more fractions of the palm kernel oil, coconut oil, or one or more fractions of the coconut oil, based on a total weight of the fat mixture. In some embodiments, the fat mixture comprises: 40% to 55% of at least one of a palm kernel oil, one or more fractions of the palm kernel oil, coconut oil, or one or more fractions of the coconut oil, based on a total weight of the fat mixture. In some embodiments, the fat mixture comprises: 40% to 50% of at least one of a palm kernel oil, one or more fractions of the palm kernel oil, coconut oil, or one or more fractions of the coconut oil, based on a total weight of the fat mixture. In some embodiments, the fat mixture comprises: 40% to 45% of at least one of a palm kernel oil, one or more fractions of the palm kernel oil, coconut oil, or one or more fractions of the coconut oil, based on a total weight of the fat mixture. In some embodiments, the fat mixture comprises: 40% to 60% of at least one of a palm kernel oil, one or more fractions of the palm kernel oil, coconut oil, or one or more fractions of the coconut oil, based on a total weight of the fat mixture, with or without hydrogenation.

In some embodiments, the palm kernel oil, the one or more fractions of the palm kernel oil, the coconut oil, and the one or more fractions of the coconut oil have an iodine value of 9 or less. In some embodiments, the palm kernel oil, the one or more fractions of the palm kernel oil, the coconut oil, and the one or more fractions of the coconut oil have an iodine value of 7 or less. In some embodiments, the palm kernel oil, the one or more fractions of the palm kernel oil, the coconut oil, and the one or more fractions of the coconut oil have an iodine value of 5 or less. In some embodiments, the palm kernel oil, the one or more fractions of the palm kernel oil, the coconut oil, and the one or more fractions of the coconut oil have an iodine value of 3 or less. In some embodiments, the palm kernel oil, the one or more fractions of the palm kernel oil, the coconut oil, and the one or more fractions of the coconut oil have an iodine value of 1 or less.

In some embodiments, the palm kernel oil, the one or more fractions of the palm kernel oil, the coconut oil, and the one or more fractions of the coconut oil have an iodine value of 1 to 9. In some embodiments, the palm kernel oil, the one or more fractions of the palm kernel oil, the coconut oil, and the one or more fractions of the coconut oil have an iodine value of 3 to 9. In some embodiments, the palm kernel oil, the one or more fractions of the palm kernel oil, the coconut oil, and the one or more fractions of the coconut oil have an iodine value of 5 to 9. In some embodiments, the palm kernel oil, the one or more fractions of the palm kernel oil, the coconut oil, and the one or more fractions of the coconut oil have an iodine value of 9.

In some embodiments, the fat mixture comprises 40% to 60% of at least one of a palm oil or one or more fractions of the palm oil, based on the total weight of the fat mixture. In some embodiments, the fat mixture comprises 45% to 60% of at least one of a palm oil or one or more fractions of the palm oil, based on the total weight of the fat mixture. In some embodiments, the fat mixture comprises 50% to 60% of at least one of a palm oil or one or more fractions of the palm oil, based on the total weight of the fat mixture. In some embodiments, the fat mixture comprises 55% to 60% of at least one of a palm oil or one or more fractions of the palm oil, based on the total weight of the fat mixture. In some embodiments, the fat mixture comprises 40% to 55% of at least one of a palm oil or one or more fractions of the palm oil, based on the total weight of the fat mixture. In some embodiments, the fat mixture comprises 40% to 50% of at least one of a palm oil or one or more fractions of the palm oil, based on the total weight of the fat mixture. In some embodiments, the fat mixture comprises 40% to 45% of at least one of a palm oil or one or more fractions of the palm oil, based on the total weight of the fat mixture. In some embodiments, the fat mixture comprises 40% to 60% of at least one of a palm oil or one or more fractions of the palm oil, based on the total weight of the fat mixture, with or without hydrogenation.

In some embodiments, the palm oil and the one or more fractions of the palm oil have an iodine value from 1 to 38. In some embodiments, the palm oil and the one or more fractions of the palm oil have an iodine value from 1 to 30. In some embodiments, the palm oil and the one or more fractions of the palm oil have an iodine value from 1 to 20. In some embodiments, the palm oil and the one or more fractions of the palm oil have an iodine value from 1 to 15. In some embodiments, the palm oil and the one or more fractions of the palm oil have an iodine value from 1 to 10. In some embodiments, the palm oil and the one or more fractions of the palm oil have an iodine value from 1 to 5. In some embodiments, the palm oil and the one or more fractions of the palm oil have an iodine value from 5 to 38. In some embodiments, the palm oil and the one or more fractions of the palm oil have an iodine value from 15 to 38. In some embodiments, the palm oil and the one or more fractions of the palm oil have an iodine value from 20 to 38. In some embodiments, the palm oil and the one or more fractions of the palm oil have an iodine value from 25 to 38.

In some embodiments, the fat comprises 2% and 40% of vegetable oil, based on a total weight of the fat. In some embodiments, the fat comprises 10% and 40% of vegetable oil, based on a total weight of the fat. In some embodiments, the fat comprises 15% and 40% of vegetable oil, based on a total weight of the fat. In some embodiments, the fat comprises 20% and 40% of vegetable oil, based on a total weight of the fat. In some embodiments, the fat comprises 25% and 40% of vegetable oil, based on a total weight of the fat. In some embodiments, the fat comprises 30% and 40% of vegetable oil, based on a total weight of the fat. In some embodiments, the fat comprises 35% and 40% of vegetable oil, based on a total weight of the fat. In some embodiments, the fat comprises 2% and 35% of vegetable oil, based on a total weight of the fat. In some embodiments, the fat comprises 2% and 30% of vegetable oil, based on a total weight of the fat. In some embodiments, the fat comprises 2% and 25% of vegetable oil, based on a total weight of the fat. In some embodiments, the fat comprises 2% and 20% of vegetable oil, based on a total weight of the fat. In some embodiments, the fat comprises 2% and 15% of vegetable oil, based on a total weight of the fat. In some embodiments, the fat comprises 2% and 10% of vegetable oil, based on a total weight of the fat.

In some embodiments, the vegetable oil comprises at least one of sunflower oil, safflower oil, low erucic rapeseed oil, canola oil, soy bean oil, high oleic sunflower oil, high oleic safflower oil, high oleic rapeseed oil, high oleic canola oil, high oleic soy bean oil, palm fractions, hybrid palm oil, olive oil or cotton oil.

In some embodiments, the fat comprises 5% to 40% of a lauric hard fat, based on the total weight of the fat. In some embodiments, the fat comprises 10% to 40% of a lauric hard fat, based on the total weight of the fat. In some embodiments, the fat comprises 15% to 40% of a lauric hard fat, based on the total weight of the fat. In some embodiments, the fat comprises 20% to 40% of a lauric hard fat, based on the total weight of the fat. In some embodiments, the fat comprises 25% to 40% of a lauric hard fat, based on the total weight of the fat. In some embodiments, the fat comprises 30% to 40% of a lauric hard fat, based on the total weight of the fat. In some embodiments, the fat comprises 35% to 40% of a lauric hard fat, based on the total weight of the fat. In some embodiments, the fat comprises 5% to 35% of a lauric hard fat, based on the total weight of the fat. In some embodiments, the fat comprises 5% to 30% of a lauric hard fat, based on the total weight of the fat. In some embodiments, the fat comprises 5% to 25% of a lauric hard fat, based on the total weight of the fat. In some embodiments, the fat comprises 5% to 20% of a lauric hard fat, based on the total weight of the fat. In some embodiments, the fat comprises 5% to 15% of a lauric hard fat, based on the total weight of the fat. In some embodiments, the fat comprises 5% to 10% of a lauric hard fat, based on the total weight of the fat. In some embodiments, the fat comprises 5% to 40% of a lauric hard fat, based on the total weight of the fat, with or without hydrogenation.

In some embodiments, the lauric hard fat has an iodine value of 9 or less. In some embodiments, the lauric hard fat has an iodine value of 7 or less. In some embodiments, the lauric hard fat has an iodine value of 5 or less. In some embodiments, the lauric hard fat has an iodine value of 3 or less. In some embodiments, the lauric hard fat has an iodine value of 1 to 9. In some embodiments, the lauric hard fat has an iodine value of 3 to 9. In some embodiments, the lauric hard fat has an iodine value of 5 to 9. In some embodiments, the lauric hard fat has an iodine value of 9.

In some embodiments, the lauric hard fat comprises at least one of palm kernel oil, one or more fractions of palm kernel oil, coconut oil, or one or more fractions of coconut oil.

In some embodiments, the fat is configured to be a cocoa butter alternative.

In some embodiments, a solid fat content of the fat is at least one of: 58% to 90% at 10 degrees Celsius, 44% to 74% at 20 degrees Celsius, 15% to 40% at 30 degrees Celsius, 12% or less at 35 degrees Celsius, and 4% or less at 40 degrees Celsius. In some embodiments, a solid fat content of the fat is 65% to 90% at 10 degrees Celsius. In some embodiments, a solid fat content of the fat is 75% to 90% at 10 degrees Celsius. In some embodiments, a solid fat content of the fat is 85% to 90% at 10 degrees Celsius. In some embodiments, a solid fat content of the fat is 58% to 85% at 10 degrees Celsius. In some embodiments, a solid fat content of the fat is 58% to 75% at 10 degrees Celsius. In some embodiments, a solid fat content of the fat is 58% to 70% at 10 degrees Celsius, In some embodiments, a solid fat content of the fat is 50% to 74% at 20 degrees Celsius. In some embodiments, a solid fat content of the fat is 55% to 74% at 20 degrees Celsius. In some embodiments, a solid fat content of the fat is 65% to 74% at 20 degrees Celsius. In some embodiments, a solid fat content of the fat is 50% to 70% at 20 degrees Celsius. In some embodiments, a solid fat content of the fat is 50% to 65% at 20 degrees Celsius. In some embodiments, a solid fat content of the fat is 50% to 60% at 20 degrees Celsius. In some embodiments, a solid fat content of the fat is 50% to 55% at 20 degrees Celsius.

In some embodiments, a solid fat content of the fat is 15% to 35% at 30 degrees Celsius. In some embodiments, a solid fat content of the fat is 15% to 30% at 30 degrees Celsius. In some embodiments, a solid fat content of the fat is 15% to 25% at 30 degrees Celsius. In some embodiments, a solid fat content of the fat is 15% to 20% at 30 degrees Celsius. In some embodiments, a solid fat content of the fat is 20% to 40% at 30 degrees Celsius. In some embodiments, a solid fat content of the fat is 25% to 40% at 30 degrees Celsius. In some embodiments, a solid fat content of the fat is 30% to 40% at 30 degrees Celsius. In some embodiments, a solid fat content of the fat is 35% to 40% at 30 degrees Celsius.

In some embodiments, a solid fat content of the fat is 10% or less at 35 degrees Celsius. In some embodiments, a solid fat content of the fat is 6% or less at 35 degrees Celsius. In some embodiments, a solid fat content of the fat is 3% or less at 35 degrees Celsius. In some embodiments, a solid fat content of the fat is 1% or less at 35 degrees Celsius. In some embodiments, a solid fat content of the fat is 0% at 35 degrees Celsius. In some embodiments, a solid fat content of the fat is 1% to 12% at 35 degrees Celsius. In some embodiments, a solid fat content of the fat is 3% to 12% at 35 degrees Celsius. In some embodiments, a solid fat content of the fat is 6% to 12% at 35 degrees Celsius. In some embodiments, a solid fat content of the fat is 12% at 35 degrees Celsius.

In some embodiments, a solid fat content of the fat is 3% or less at 40 degrees Celsius. In some embodiments, a solid fat content of the fat is 2% or less at 40 degrees Celsius. In some embodiments, a solid fat content of the fat is 1% or less at 40 degrees Celsius. In some embodiments, a solid fat content of the fat is 0% at 40 degrees Celsius. In some embodiments, a solid fat content of the fat is 1% to 4% at 40 degrees Celsius. In some embodiments, a solid fat content of the fat is 2% to 4% at 40 degrees Celsius. In some embodiments, a solid fat content of the fat is 4% at 40 degrees Celsius.

In some embodiments, the fat has a slip melting point of the fat is 36 to 40 degrees Celsius. In some embodiments, the fat has a slip melting point of the fat is 38 to 40 degrees Celsius. In some embodiments, the fat has a slip melting point of the fat is 36 to 38 degrees Celsius. In some embodiments, the fat has a slip melting point of the fat is 36 degrees Celsius. In some embodiments, the fat has a slip melting point of the fat is 40 degrees Celsius.

In some embodiments, the trans fatty acids are less than 1%. In some embodiments, the trans fatty acids are 0%. In some embodiments, the trans fatty acids are 0.5%.

In some embodiments, the fat comprises 3% or less of an emulsifier or an additive. In some embodiments, the fat comprises 2% or less of an emulsifier or an additive. In some embodiments, the fat comprises 1% or less of an emulsifier or an additive. In some embodiments, the fat comprises 0% of an emulsifier or an additive. In some embodiments, the fat comprises 1% to 3% of an emulsifier or an additive. In some embodiments, the fat comprises 3% of an emulsifier or an additive. In some embodiments, the fat comprises 1% of an emulsifier or an additive.

In some embodiments, the emulsifier or additive is at least one of a monoglyceride, diglyceride or triglyceride mixture of saturated fatty acids having at least 16 carbon atoms each, sorbitan esters (STS/SMS), polyglycerol, or polyglycerol esters. In some embodiments, the emulsifier or additive is at least one of a monoglyceride, diglyceride or triglyceride mixture of saturated fatty acids having at least 18 carbon atoms each. In some embodiments, the emulsifier or additive is at least one of a monoglyceride, diglyceride or triglyceride mixture of saturated fatty acids having at least 20 carbon atoms each. In some embodiments, the emulsifier or additive is at least one of a monoglyceride, diglyceride or triglyceride mixture of saturated fatty acids having at least 22 carbon atoms each. In some embodiments, the emulsifier or additive is at least one of a monoglyceride, diglyceride or triglyceride mixture of saturated fatty acids having at least 24 carbon atoms each.

In some embodiments, the saturated fatty acid content of the fat of the present invention is 16% to 38% less than standard lauric cocoa butter alternative having 99% to 100% saturated fatty acid content, based on the total amount of fatty acids in the fat. In some embodiments, the saturated fatty acid content of the fat of the present invention is 16% to 30% less than standard lauric cocoa butter alternative having 99% to 100% saturated fatty acid content, based on the total amount of fatty acids in the fat. In some embodiments, the saturated fatty acid content of the fat of the present invention is 16% to 25% less than standard lauric cocoa butter alternative having 99% to 100% saturated fatty acid content, based on the total amount of fatty acids in the fat. In some embodiments, the saturated fatty acid content of the fat of the present invention is 16% to 20% less than standard lauric cocoa butter alternative having 99% to 100% saturated fatty acid content, based on the total amount of fatty acids in the fat. In some embodiments, the saturated fatty acid content of the fat of the present invention is 20% to 38% less than standard lauric cocoa butter alternative having 99% to 100% saturated fatty acid content, based on the total amount of fatty acids in the fat. In some embodiments, the saturated fatty acid content of the fat of the present invention is 25% to 38% less than standard lauric cocoa butter alternative having 99% to 100% saturated fatty acid content, based on the total amount of fatty acids in the fat. In some embodiments, the saturated fatty acid content of the fat of the present invention is 30% to 38% less than standard lauric cocoa butter alternative having 99% to 100% saturated fatty acid content, based on the total amount of fatty acids in the fat.

In some embodiments, the present invention is a trans-fat free cocoa butter alternative and method of making thereof which has a lower concentration of saturated fatty acids than cocoa butter, common cocoa butter alternatives, and lauric fats. In some embodiments, the alternative is configured to be used in coating and molding applications and in chocolate products. In some embodiments, the trans-fat free cocoa butter alternative has at least one of: adequate texture, gloss, and melting profile characteristics, and a good speed of crystallization during a cooling process without tempering.

In some embodiments, the present invention is a method comprising combining a lauric fat having an iodine value less than 10 with a non-lauric fat having an iodine value from 1 to 38 to form a fat mixture, wherein the fat mixture comprises 40% to 60% lauric fat and 40% to 60% non-lauric fat based on a total weight of the fat mixture. In some embodiments, the method comprises interesterifying the fat mixture. In some embodiments, the method comprises producing a lauric hard fat of at least one of palm kernel or coconut oil having an iodine value of 9 or less from a fractionation process. In some embodiments, the method comprises blending the interesterified fat mixture, the lauric hard fat and a vegetable oil to form a blended fat.

In some embodiments, the lauric fat and non-lauric fat included in the combining step of the method are the lauric fat and non-lauric fat detailed herein. In some embodiments, the weight percents of the lauric fat and non-lauric fat of the fat mixture formed from the combining step of the method are as detailed herein.

In some embodiments, the fractionation process of the oil is conducted in static equipment such as trays in a cooling room and/or Statolizer® (trademark by Desmet Ballestra) equipment. In some embodiments, the process further includes cooling the oil. In some embodiments, the oil is cooled to a temperature of 15 to 20 degrees Celsius. In some embodiments, the oil is cooled to a temperature of about 18.5 degrees Celsius. In some embodiments, the process further includes filtering the cooled oil. In some embodiments, the filtering is conducted in a high pressure chamber filter up to a pressure of 27 Bar. In some embodiments, the high pressure chamber filter is operated at a pressure sufficient for filtering the oil.

In some embodiments, the stearin from the fractionation process is fully hydrogenated. In some embodiments, the stearin from the fractionation process is not fully hydrogenated. In some embodiments, the stearin from the fractionation process is bleached. In some embodiments, the stearin from the fractionation process is deodorized.

In some embodiments, the interesterification process includes heating of the oil in the presence of chemical catalyst such as sodium methoxide. In some embodiments, the oil is heated to a temperature between 90 and 105 degrees Celsius. In some embodiments, the oil is filtered sufficiently to separate the catalyst. In some embodiments, the oil is bleached. In some embodiments, the oil is deodorized.

In other embodiment the interesterification process includes heating of the oil in the presence of an enzymatic catalyst such as Lipozime TI-IM® (trademark from Novozimes). In some embodiments, the oil is heating to a temperature of 68 to 74 degrees Celsius. In some embodiments, the process further includes passing the oil through an enzyme packed column. In some embodiments, the process includes bleaching the oil. In some embodiments, the process including refining the oil.

In some embodiments, the blended fat comprises 28 to 95% of the interesterified mixture, from 2% to 40% of the vegetable oil and from 5 to 40% of the hard lauric fat, based on the total weight of the blended fat. In some embodiments, the blended fat comprises one or more of the fats detailed herein.

In some embodiments, the method comprises adding 3% or less of an emulsifier or additive. In some embodiments, the emulsifier or additive is at least one of a monoglyceride, diglyceride or triglyceride mixture of saturated fatty acids having at least 16 carbon atoms each, sorbitan esters (STS/SMS), polyglycerol, or polyglycerol esters.

In one embodiment of the present invention, the cocoa butter alternative can be used as a constituent of a chocolate composition or cocoa confectionary product. In one non-limiting example, a chocolate composition includes cocoa powder, sugar, and a fat. In another non-limiting example, depending on the type of chocolate, the chocolate composition can also include milk powder, such as skimmed milk powder, full cream milk power, or whey milk powder, lecithin, polyglycerol polyricinoleate, and vanilla extract. In another non-limiting example, the sugar may include a low calorie sugar alternative, such as maltitol, SPLENDA®, and the like. Table 1 illustrates a non-limiting example chocolate composition.

TABLE 1

| Chocolate Composition | |
| --- | --- |
| Fat % | 20%-40% |
| Sugar % | 38%-52% |
| SKMP (Skimmed milk powder) and/or whey powder % | 2%-15% |
| Cocoa powder % | 5%-25% |
| Lecithin % | 0.8% or less |
| PGPR (Polyglycerol polyricinoleate) % | 0.5% or less |
| Vanilla extract % | trace amounts |
| % of total chocolate composition by weight | 100% |

In an embodiment of the present invention, the cocoa butter alternative can be used as the fat in the chocolate composition to create a chocolate composition with 40% or less saturated fatty acid content. For example, in an embodiment, the cocoa butter alternative can partially or completely replace the fat used in the chocolate composition. In one non-limiting example, the chocolate composition includes 34% cocoa butter alternative, based on a total weight of the chocolate composition. In another example, depending on the application for the chocolate composition, the chocolate composition may include between 20% and 40% cocoa butter alternative, based on the total weight of the chocolate composition.

In an embodiment of the present invention, the chocolate composition has limited amounts of other fats constituents in the fat of the chocolate composition. For example, in one embodiment, the chocolate composition has 5% or less cocoa butter, including any residual cocoa butter present in the cocoa powder or any cocoa butter included in the cocoa butter alternative itself. In another embodiment of the present invention, the chocolate composition may include additional lauric fats or other cocoa butter alternatives, such as hydrogenated palm kernel stearin, hydrogenated palm kernel oil, coconut oil, or their fractions, so long as the total content of saturated fatty acids in the chocolate composition is 40% or less.

In other embodiments of the present invention, the chocolate composition has 5% or less of cocoa butter replacements ("CBRs"), such as hydrogenated soybean, cottonseed, and palm oils, separate from any CBRs present in the in the cocoa butter alternative.

In other embodiments of the present invention, the chocolate composition has less than 1% each of cocoa butter, lauric fats, CBRs, and CBSs separate from the residual cocoa butter present in the cocoa powder or any cocoa butter, lauric fats, CBRs, and CBSs present in the cocoa butter alternative itself.

In one embodiment of the present invention, an amount of additional cocoa butter, lauric fats, CBRs, and other CBSs added to the chocolate composition, and separate from the residual cocoa butter present in the cocoa powder or any cocoa butter, lauric fats, CBRs, and other CBSs present in the cocoa butter alternative itself, is limited to maintain an overall saturated fatty acid content of the chocolate composition at 50% or less, based on the total fatty acid content of the chocolate composition. In another embodiment, the amount of additional cocoa butter, lauric fats, CBRs, and other CBSs added to the chocolate composition, and separate from the residual cocoa butter present in the cocoa powder or any cocoa butter, lauric fats, CBRs, and other CBSs present in the cocoa butter alternative itself, is limited to maintain an overall trans fatty acid content of the chocolate composition at 2% or less, based on a total fatty acid content in the chocolate composition.

In an embodiment of the present invention, when a chocolate composition is used for chocolate molding applications, the chocolate composition has between 25% to 35% cocoa butter alternative. In another embodiment of the present invention, the chocolate composition has between 30% to 33% cocoa butter alternative when used for chocolate molding applications. Examples of chocolate molding applications include the creating of tablets, figures, drops, and chips, and chocolate hard filings.

In an embodiment of the present invention, when the chocolate composition is used for chocolate coating applications, the chocolate composition has between 28% to 40% cocoa butter alternative. In another embodiment of the present invention, the chocolate composition has between 32% to 37% cocoa butter alternative when used for chocolate coating applications. Examples of chocolate coating applications include the use of the chocolate composition as couverture, and the coating of bakery products (such as cakes, rolls, and cookies), gums, and marshmallows.

In an embodiment of the present invention, when the chocolate composition is used in chocolate coating applications, the chocolate composition does not need tempering. For example, in one embodiment of the present invention, the chocolate composition can be coated on an edible food product at between 38 to 45 degrees Celsius without tempering to form a chocolate covered food product.

In one embodiment, although chocolate composition embodiments of the present invention may have between 60% and 85% saturated fatty acids (much less than chocolates using lauric fats or other CBSs with a high saturated fat content), chocolate composition embodiments of the present invention may exhibit similar speeds of crystallization in the cooling tunnel (at 5-10° C.) as chocolates using lauric fats, CBSs, and CBRs. For example, in an embodiment of the present invention, the chocolate composition has a enrobing crystallization residence time of 5 minutes or less when applied at between 38 and 44 degrees Celsius and subjected to a 4 meter cooling tunnel at between 5 to 10 degrees Celsius and with air circulation.

In a non-limiting example, an exemplary chocolate composition was prepared under an embodiment of the present invention by first mixing the cocoa butter alternative, sugar, SKMP, cocoa powder, and a trace amount of vanilla extract, and refining the mixture to up to a 28 micron particle size in a ball refiner mill at 55 degrees Celsius for 15 minutes. The lecithin and the PGPR where then added dissolved in a small amount of the cocoa butter alternative (~2%). The final composition of this exemplary chocolate composition is listed below in Table 2.

TABLE 2

| Exemplary Chocolate Composition | |
|---|---|
| Fat % | 33 |
| Sugar % | 44.4 |
| SKMP (Skimmed milk powder) % | 13 |
| Cocoa powder % | 9 |
| Lecithin % | 0.5 |
| PGPR (Polyglycerol polyricinoleate) % | 0.1 |
| Vanilla extract % | trace |
| % of total chocolate composition by weight | 100 |

This exemplary chocolate composition was then applied, without a tempering process, at 38 to 42 degrees Celsius to various food products (cookies, cakes and marshmallows) and crystallized in a 4 meter cooling tunnel at between 5 and 8 degrees Celsius with air circulation. The residence time in the tunnel was progressively decreased from 10 minutes to 5 minutes while noting the crystallization quality in the coated food products. These chocolate covered food products had characteristics similar to that of chocolates with much higher saturated fat contents. For example, the food products coated with the chocolate composition prepared above had a gloss, a finger-print resistance, a 30 degrees Celsius heat resistance, and a gradual melting profile characteristics similar to edible food products coated with a standard saturated chocolate fats The chocolate composition was also molded into figures and tablets without tempering process, at 38 to 42 degrees Celsius and then cooled in a chamber at 8 degrees Celsius for 35 minutes, the tablets and figures were demoulded showing good shrinkage and gloss.

Non-Limiting Example 1

In the following non-limiting example, a hard lauric fat (A) was produced from a fractionation process of palm kernel oil at 18 degree Celsius for 6 hours. Next, after filtering, the stearin having an iodine value of 7 was collected. The stearin was then completely hydrogenated at 170 degrees Celsius in the presence of a nickel catalyst to an iodine value of 0.5 to obtain a fat. The fat was then refined, bleached and deodorized at 245 degrees Celsius to form hard lauric fat (A).

In this non-limiting example, a lauric/non lauric fat (B) was produced from a mixture of 60% of palm kernel oil and 40% of palm oil. The mixture was subjected to a hydrogenation process at 175 degrees Celsius in the presence of nickel catalyst to obtain a fat with an iodine value of 1. This hydrogenated fat was then interesterified in presence of sodium methoxide to obtain a fat. The fat was then refined, bleached and deodorized to form lauric/non lauric fat (B).

In this non-limiting example, a mixture of: (i) 35% of the hard lauric fat (A), (ii) 28% of the lauric/non lauric fat (B), (iii) 36% of RBD (refined, bleached and deodorized) Canola oil and (iv) 1% of an emulsifier made from mono and triglycerides of fully rapeseed oil with an iodine value less than 2 was generated to obtain a trans free cocoa butter alternative with 65% saturated fatty acids compared with a 99% saturated fatty acids of a standard lauric cocoa butter alternative.

The following tables 3, 4, and 5 identify the physical characteristics of the fat (A), fat (B) and the trans free cocoa butter alternative.

TABLE 3

| Non-Limiting Example 1: Composition of hard lauric fat (A) | |
|---|---|
| FATTY ACID COMPOSITION | |
| C 8:0 Caprylic acid | 1.6% |
| C10:0 Capric acid | 2.4% |
| C12:0-lauric acid | 50.6% |
| C14:0 Myristic acid | 21.7% |
| C16:0-Palmitic acid | 9.9% |
| C18:0- Stearic acid | 13.5% |
| C18:1- Oleic acid | 0.12% |
| Others | 0.1% |
| SLIP MELTING POINT ° C. | 34.5° C. |

TABLE 3-continued

Non-Limiting Example 1: Composition of hard lauric fat (A)

| SOLID FAT CONTENT (NMR) | |
| --- | --- |
| N20 | 92.2 |
| N30 | 40.5 |
| N35 | 5.1 |
| N40 | 0 |
| FFA % (free fatty acid as oleic acid %) | 0.03 |

TABLE 4

Non-Limiting Example 1: Composition of interesterified lauric/non lauric fat (B)

| FATTY ACID COMPOSITION | |
| --- | --- |
| C 8:0 Caprylic acid | 1.95% |
| C10:0 Capric acid | 1.93% |
| C12:0-lauric acid | 27.97% |
| C14:0 Myristic acid | 10.09% |
| C16:0-Palmitic acid | 21.9% |
| C18:0- Stearic acid | 34.21% |
| C18:1- Oleic acid | 0.87% |
| Others | 1.08% |
| SLIP MELTING POINT ° C. | 43.2° C. |
| SOLID FAT CONTENT (NMR) | |
| N20 | 91.78 |
| N30 | 66.22 |
| N35 | 44.32 |
| N40 | 18.67 |
| FFA % (free fatty acid as oleic acid %) | 0.04 |

TABLE 5

Non-Limiting Example 1: Trans free cocoa butter alternative

| ANALYSIS | RESULTS |
| --- | --- |
| Free fatty acid % (as oleic acid %) | 0.03 |
| Slip melting point, ° C. | 38.4 |
| Solid fat content (NMR) | |
| N10 | 61.5 |
| N20 | 49.2 |
| N30 | 21.5 |
| N35 | 8.4 |

TABLE 6

Non-Limiting Example 1: Fatty Acid Content of trans free cocoa butter alternative

| Fatty acid | % in the whole cocoa butter alternative |
| --- | --- |
| Saturated fatty acids | |
| Caproic acid | 0.048 |
| Caprylic acid | 0.992 |
| Capric acid | 1.32 |
| Lauric acid | 24.67 |
| Myristic acid | 9.89 |
| Palmitic acid | 11.49 |
| Margaric acid | 0.04 |
| Stearic acid | 15.26 |
| Arachidic acid | 0.4 |

TABLE 6-continued

Non-Limiting Example 1: Fatty Acid Content of trans free cocoa butter alternative

| Fatty acid | % in the whole cocoa butter alternative |
| --- | --- |
| Behenic acid | 0.02 |
| Lignoceric acid | 0.1 |
| Total saturated fatty acid content in the composition (%) | 64.2 |
| Unsaturated fatty acids | |
| Palmitoleic acid | 0.077 |
| Oleic acid | 23.95 |
| Linoleic acid | 7.9 |
| Gondoic acid | 0.1 |
| Linolenic acid | 2.7 |
| Total unsaturated fatty acid content in the composition (%) | 34.8 |

Non-Limiting Example 2

In this non-limiting example, a lauric/non lauric fat (A) was produced, in the presence of a sodium methoxide catalyst, from an interesterification of a mixture of: (i) 52% of palm stearin with an iodine value of 36.5 produced from a palm oil fractionation process at a final temperature of 18.5 degrees Celsius with a stearin yield of 25%; and (ii) 48% of palm kernel stearin with an iodine value of 6.5 produced from a fractionation process of palm kernel oil at a temperature of 18.5 degrees Celsius for 7 hours and a stearin yield of 30%. The resultant fat was then subjected to refining, bleaching and deodorizing at 248 degrees Celsius.

In this non-limiting example, a lauric fat (B) was also produced from a fractionation process of palm kernel oil at 18.5 degrees Celsius for 7 hours with a stearin yield of 30% and an iodine value of 6.5. The fat was then refined, bleached and deodorized at 246 degrees Celsius to form the lauric fat (B).

In this non-limiting example, a mixture of: (i) 93% of the lauric fat (A), (ii) 4% of the lauric fat (B) and (iii) 3% of canola oil was made to obtain a trans free cocoa butter alternative with 76% of saturated fatty acids compared to a 99% saturated fatty acids of a standard lauric cocoa butter alternative.

The following tables 7, 8 and 9 identify the physical characteristics of the fat (A), fat (B) and the trans free cocoa butter alternative.

TABLE 7

Non-Limiting Example 2: Composition of interesterified fat (A)

| FATTY ACID COMPOSITION | |
| --- | --- |
| C 8:0 Caprylic acid | 0.46% |
| C10:0 Capric acid | 0.92% |
| C12:0-lauric acid | 22.33% |
| C14:0 Myristic acid | 10.81% |
| C16:0-Palmitic acid | 37.1% |
| C18:0- Stearic acid | 4.3% |
| C18:1- Oleic acid | 19.1% |
| C18:2 Linoleic acid | 3.5% |
| Others | 1.48% |
| SLIP MELTING POINT ° C. | 37° C. |

TABLE 7-continued

Non-Limiting Example 2: Composition of interesterified fat (A)

SOLID FAT CONTENT (NMR)

| | |
|---|---|
| N10 | 86.7 |
| N20 | 64.7 |
| N30 | 27.7 |
| N35 | 10 |
| FFA %(free fatty acid as oleic acid %) | 0.01 |

TABLE 8

Non-Limiting Example 2, Composition of lauric fat (B)

FATTY ACID COMPOSITION

| | |
|---|---|
| C 8:0 Caprylic acid | 1.4% |
| C10:0 Capric acid | 2.5% |
| C12:0-lauric acid | 54.6% |
| C14:0 Myristic acid | 23.1% |
| C16:0-Palmitic acid | 9.2% |
| C18:0- Stearic acid | 3.1% |
| C18:1- Oleic acid | 6.1% |
| SLIP MELTING POINT ° C. | 32.5° C. |

SOLID FAT CONTENT (NMR)

| | |
|---|---|
| N20 | 90.4 |
| N30 | 38.1 |
| N35 | 1.5 |
| N40 | 0 |
| FFA % (free fatty acid as oleic acid %) | 0.01 |

TABLE 9

Non-Limiting Example 2: Trans free cocoa butter alternative

| ANALYSIS | RESULTS |
|---|---|
| Free fatty acid % (as oleic acid %) | 0.15 |
| Slip melting point, ° C. | 35.5 |
| Solid fat content (NMR) | |
| N10 | 84.91 |
| N20 | 63.2 |
| N30 | 26.7 |
| N35 | 8.3 |

TABLE 10

Non-Limiting Example 2: Fatty Acid Content of trans free cocoa butter alternative

| Fatty acid | % in the whole cocoa butter alternative |
|---|---|
| Saturated fatty acids | |
| Caprylic acid | 0.49 |
| Capric acid | 0.95 |
| Lauric acid | 22.96 |
| Myristic acid | 10.98 |
| Palmitic acid | 35.03 |
| Stearic acid | 4.19 |
| Others | 0.6 |
| Total saturated fatty acid content in the composition (%) | 75.2 |
| Unsaturated fatty acids | |
| Palmitoleic acid | 0.04 |
| Oleic acid | 19.97 |
| Linoleic acid | 3.86 |
| Gondoic acid | 0.01 |
| Linolenic acid | 0.34 |
| Total unsaturated fatty acid content in the composition (%) | 24.2 |

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A fat comprising:
   (i) 62% to 84% saturated fatty acid content, based on a total amount of fatty acids in the fat,
   wherein the saturated fatty acid content of the fat comprises:
   (a) 20% to 40% ! auric acid content,
   (b) 8% to 20% myristic acid content,
   (c) 9% to 37% palmitic acid content, and
   (d) 3% to 17% stearic acid content;
   (ii) 16% to 38% unsaturated fatty acid content, based on the total amount of fatty acids in the fat,
   wherein the unsaturated fatty acid content of the fat comprises:
   (a) 15% to 30% oleic acid content,
   (b) 10% or less linoleic acid content; and
   (c) 4% or less linolenic acid content;
   (iii) 28% to 90% of an interesterified fat mixture of lauric and non-lauric vegetable oils, based on a total weight of the fat,
   wherein the fat mixture comprises:
   (a) 40% to 60% of at least one of a palm kernel oil, one or more fractions of the palm kernel oil, coconut oil, or one or more fractions of the coconut oil, based on a total weight of the fat mixture,
   wherein the palm kernel oil, the one or more fractions of the palm kernel oil, the coconut oil, and the one or more fractions of the coconut oil have an iodine value of 9 or less, and
   (b) 40% to 60% of at least one of a palm oil or one or more fractions of the palm oil, based on the total weight of the fat mixture,
   wherein the palm oil and the one or more fractions of the palm oil have an iodine value from 1 to 38;
   (iv) 2% and 40% of vegetable oil, based on a total weight of the fat, wherein the vegetable oil comprises at least one of sunflower oil, safflower oil, low erucic rapeseed oil, canola oil, soy bean oil, high oleic sunflower oil, high oleic safflower oil, high oleic rapeseed oil, high oleic canola oil, high oleic soy bean oil, palm fractions, hybrid palm oil, olive oil or cotton oil;
   (v) 5% to 40% of a lauric hard fat, based on the total weight of the fat, wherein the lauric hard fat has an iodine value of 9 or less and wherein the lauric hard fat comprises at least one of palm kernel oil, one or more fractions of palm kernel oil, coconut oil, or one or more fractions of coconut oil; and wherein the fat is configured to be a cocoa butter alternative.

2. The fat of claim 1, wherein a solid fat content of the fat is at least one of:
58% to 90% at 10 degrees Celsius,
44% to 74% at 20 degrees Celsius,
15% to 40% at 30 degrees Celsius,
12% or less at 35 degrees Celsius, and
4% or less at 40 degrees Celsius, and
wherein a slip melting point of the fat is 36 to 40 degrees Celsius, and
wherein trans fatty acids are less than 1%.

3. The fat of claim 1, further comprising 3% or less of an emulsifier or an additive.

4. The fat of claim 3, wherein the emulsifier or additive is at least one of a monoglyceride, diglyceride or triglyceride mixture of saturated fatty acids having at least 16 carbon atoms each, sorbitan esters (STS/SMS), polyglycerol, or polyglycerol esters.

\* \* \* \* \*